United States Patent
Ramey et al.

(10) Patent No.: US 6,793,584 B2
(45) Date of Patent: Sep. 21, 2004

(54) HIGH SPEED JOINT LABYRINTH STYLE VENT

(75) Inventors: John A. Ramey, St. Clair Shores, MI (US); Michael James Miller, White Lake, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/137,823

(22) Filed: May 2, 2002

(65) Prior Publication Data

US 2003/0207714 A1 Nov. 6, 2003

(51) Int. Cl.[7] ............................................... F16D 3/84
(52) U.S. Cl. ...................................................... 464/175
(58) Field of Search ........................... 464/15, 17, 175; 403/50; 277/634, 636, 928

(56) References Cited

U.S. PATENT DOCUMENTS

| | | | |
|---|---|---|---|
| 4,224,808 A | * | 9/1980 | Gehrke ........................ 464/175 |
| 4,282,722 A | * | 8/1981 | Orain .......................... 464/175 |
| 4,392,838 A | * | 7/1983 | Welschof et al. ............ 464/175 |
| 4,559,025 A | * | 12/1985 | Dore ........................... 464/175 |
| 6,179,717 B1 | * | 1/2001 | Schwarzler .................. 464/175 |

* cited by examiner

Primary Examiner—David Bagnell
Assistant Examiner—K. Thompson
(74) Attorney, Agent, or Firm—Jennifer M. Brumbaugh; Mick A. Nylander (57) ABSTRACT

A constant velocity joint vent for use in a constant velocity joint of an automotive vehicle. The constant velocity joint vent includes a body generally having a cylindrical shape. The constant velocity joint vent also includes a first axial channel on an inside surface of the body. A semi circumferential channel is in communication with the first axial channel on one end thereof also on the inside surface of the body. A second axial channel in communication with the semi circumferential channel on another end thereof. The vent also includes a diaphragm in communication with the second axial channel and the outer atmosphere. The vent will operate such that high pressure and high temperature gases are vented to the outer atmosphere while any contaminants or water are repelled from entering the constant velocity joint chamber.

18 Claims, 4 Drawing Sheets

HIGH SPEED JOINT LABYRINTH STYLE VENT

TECHNICAL FIELD

The present invention generally relates to constant velocity joints, and more particularly, relates to a labyrinth style vent for use in an constant velocity high-speed joint.

DESCRIPTION OF RELATED ART

Constant velocity joints (CV joints) are common components in automotive vehicles. Typically constant velocity joints are used where transmission of a constant velocity rotary motion is desired or required. The common types of constant velocity joints are plunging tripod, fixed tripod, a plunging ball joint and a fixed ball joint. These common types of constant velocity joints are either usually in a mono block style or disk style. These constant velocity joints currently are used in front wheel drive vehicles or rear wheel drive vehicles and on the propeller shafts found in rear wheel drive, all wheel drive and four-wheel drive vehicles. Plunging CV joints allow for axial movement during operation without the use of slip splines.

Constant velocity joints are generally grease lubricated for life and sealed by a boot. Thus, constant velocity joints are sealed in order to retain grease inside the joints while keeping contaminants and foreign matter, such as dirt and water, out of the joint. To achieve this protection, the constant velocity joint is usually enclosed at the open end of the outer race by a sealing boot made of a rubber, thermoplastic, silicone or other pliable material. The opposite end of the outer race is generally enclosed by a dome or cap, known as a grease cap in the case of a disk type joint. A mono block or integral stem and race design style does not use a grease cap. Instead it is sealed by the internal geometry of the outer race. The sealing and protection of the constant velocity joint is necessary because contamination of the inner chamber may cause internal damage and destruction of the joint. Furthermore, once the inner chamber of the constant velocity joint is lubricated, it is lubricated for life During operation, the constant velocity joint creates internal pressure in the inner chamber of the joint. The higher the speeds that the constant velocity joint rotates at the greater these pressures become. These pressures have to be vented to the outer atmosphere in order to prevent pressure build up which occurs during operation of the joint and may destroy the boot. If the pressure build up is allowed to reach critical state, the boot may crack and have a blowout thus losing sealablity. Certain constant velocity joint designs are vented by placing a small hole generally in the center of the grease cap or at lease one hole around the outer periphery of the outer race. These prior methods of venting the gas are not completely reliable because if the constant velocity joint is in a static state and not rotating, the lubricating grease may migrate towards the vent hole and block or hinder its function of venting any internal gas pressure. This type of vent may also allow the infiltration of contaminants into the internal chamber of the constant velocity joint. Furthermore, the constant velocity joint has a tendency, after running for long periods of time, to create very high temperatures along with the high pressures which are vented through the prior art vent holes. However, if the constant velocity joint is submerged or saturated in water or other contaminants, the water or other contaminants will, via a pressure differential, be sucked into the constant velocity joint thus contaminating the grease and reducing the life of the constant velocity joint.

Therefore, the introduction of water and other contaminants through the vent hole may reduce the life expectancy of the constant velocity joint.

Therefore, there is a need in the art for a constant velocity joint that will prevent the build up of internal gas pressure while eliminating the ingress of contaminants into the constant velocity joint. Furthermore, there is a need in the art for a vent that is low in cost, easy to manufacture and install on the constant velocity joint.

DISCLOSURE OF THE INVENTION

One object of the present invention is to provide an improved constant velocity joint.

Another object of the present invention is to provide a new vent solution for a constant velocity joint.

Yet a further object of the present invention is to provide a vent for a constant velocity joint that is capable of releasing gas under pressure to the atmosphere.

Still a further object of the present invention is to provide a vent that will prevent the entry of contaminants and water into the constant velocity joint inner chamber.

Yet a further object of the present invention is to provide a constant velocity joint that will vent and allow equalization of pressure internally from the constant velocity joint relative to the atmosphere along a shaft of the constant velocity joint.

To achieve the foregoing objects, a vent for a constant velocity joint is disclosed. The constant velocity joint vent includes a body generally having a cylindrical shape. The vent also includes a first axial channel on the inside surface of the body. A semi circumferential channel is in communication with the first axial channel on one end thereof. The vent also includes a second axial channel in communication with the semi circumferential channel on another end thereof. The vent also includes a diaphragm in communication with the second axial channel. The diaphragm allows for pressure to be released and also prevent the ingress of contaminants into the constant velocity joint.

One advantage of the present invention is that the constant velocity joint includes a vent that allows for equalization of pressure inside the constant velocity joint to the outer atmosphere.

A further advantage of the present invention is that the constant velocity joint vent will top the entry of contaminants into the constant velocity joint internal chamber.

Still a further advantage of the present invention is that the vent is specifically tuned to work at the high speeds of the constant velocity joint and still allows for the venting between the outside atmosphere and the internal chamber of the constant velocity joint.

Yet another advantage of the present invention is that the constant velocity joint vent is directly molded into the inside surface of the boot thus reducing the complexity of the manufacturing and installation of the vent feature.

Other objects, features and advantages of the present invention will become apparent from the subsequent description and the appended claims, taken in conjunction with the accompanying drawings.

BEST MODE FOR CARRYING OUT THE INVENTION

Referring to the drawings, a constant velocity joint 10 according to the present invention is shown. It should be noted that any type of constant velocity joint 10, such as a plunging tripod, fixed tripod, etc. maybe used according to the present invention. The present invention includes a novel and improved method of venting the constant velocity joint 10.

Figure 1:
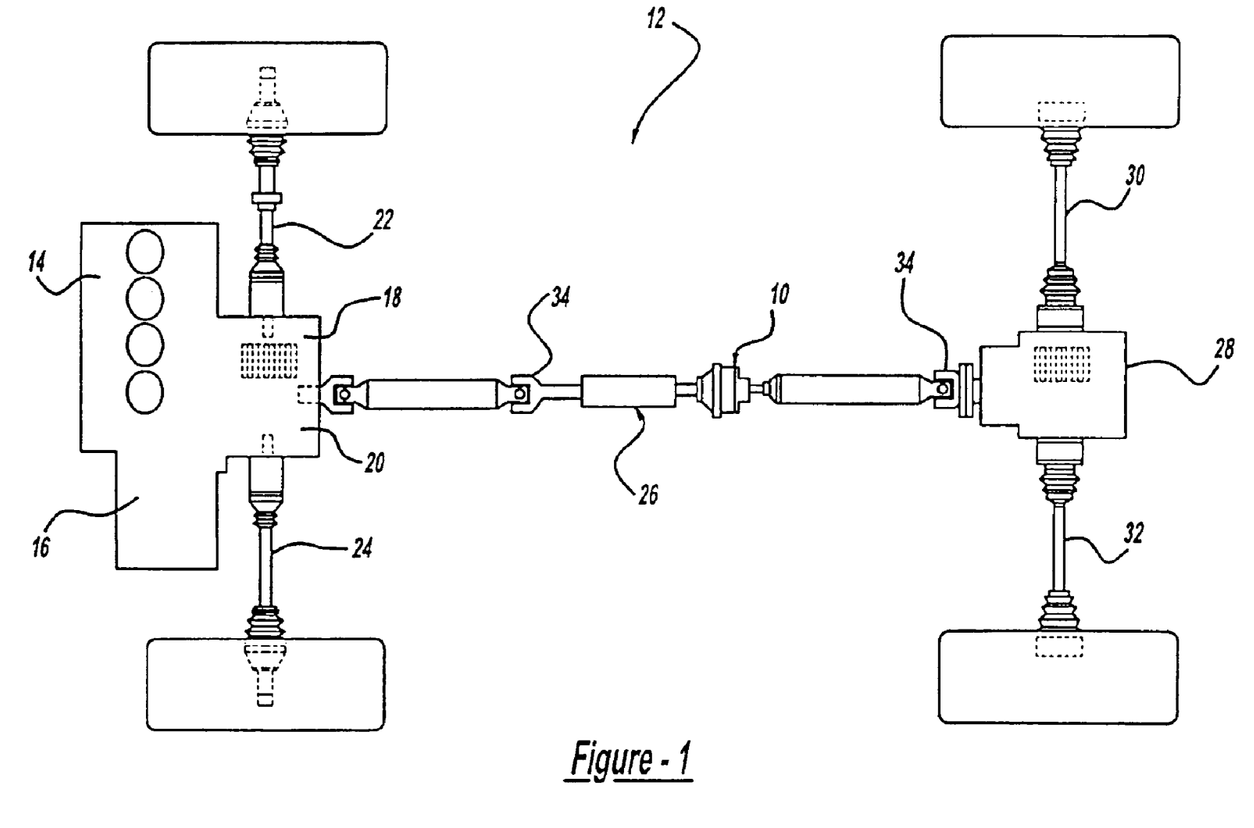
FIG. 1 shows a plan view for a vehicle driveline.

FIG. 1 shows a typical driveline of an automotive vehicle 12. The driveline shown in FIG. 1 can be a typical all wheel drive vehicle, however it should be noted that the constant velocity joint 10 of the current invention can also be used in a rear wheel drive vehicle, front wheel drive vehicle, all wheel drive or four wheel drive vehicle. The driveline includes an engine 14 that is connected to a transmission 16 and a power take off unit 18. The front differential 20 has a right hand front half shaft 22 and a left hand front half shaft 24, each of which are connected to a wheel and deliver power to the wheels. On both ends of the right hand front half shaft 22 and the left hand front half shaft 24 are constant velocity joints 10. A propeller shaft 26 connects the front differential 20 to the rear differential 28, wherein the rear differential 28 includes a rear right hand half shaft 30 and a rear left hand half shaft 32, each of which ends with a wheel on one end thereof. A CV joint 10 is located on both ends of the half shaft that connect to the wheel and rear differential 28. The propeller shaft 26, as shown in FIG. 1, is a three-piece propeller shaft that includes a plurality of Carden joints 34 and one high-speed constant velocity joint 10. The constant velocity joints 10 transmit power to the wheels through the drive shaft 26, even if the wheels or the shaft 26 have changing angles due to steering, raising or lowering of the suspension of the vehicle 12. The constant velocity joints 10 maybe of any of the standard types known, such as plunging tripod, a cross groove joint, a fixed joint, a fixed tripod joint, or double offset joint, all of which are commonly known terms in the art for different varieties of constant velocity joints. Constant velocity joints allow for transmission of constant velocities at angles which are found in everyday driving conditions of automotive vehicles on both the half shafts and prop shafts of these vehicles.

Figure 2:
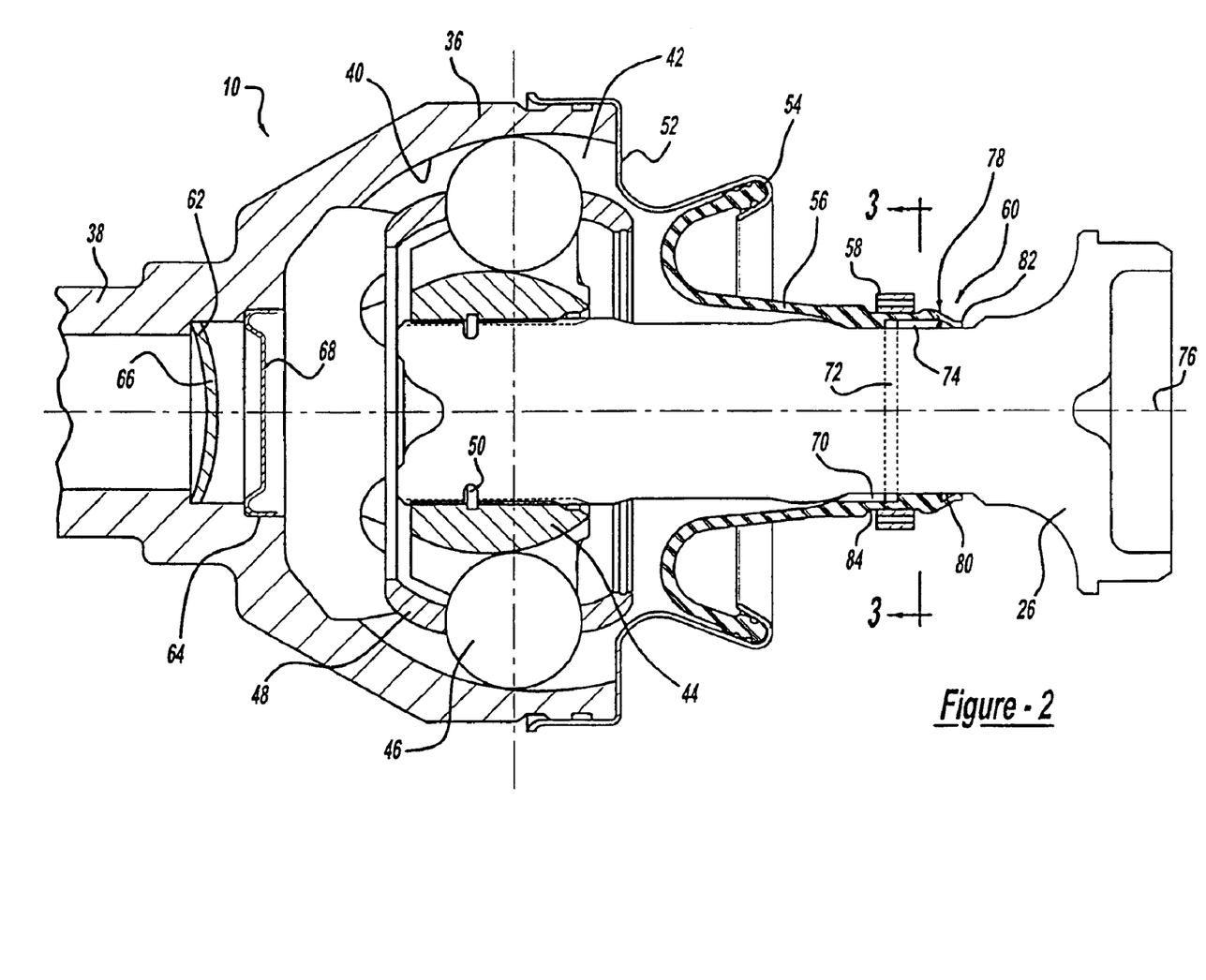
FIG. 2 shows a cross section of the constant velocity joint according to the present invention.
Figure 3:
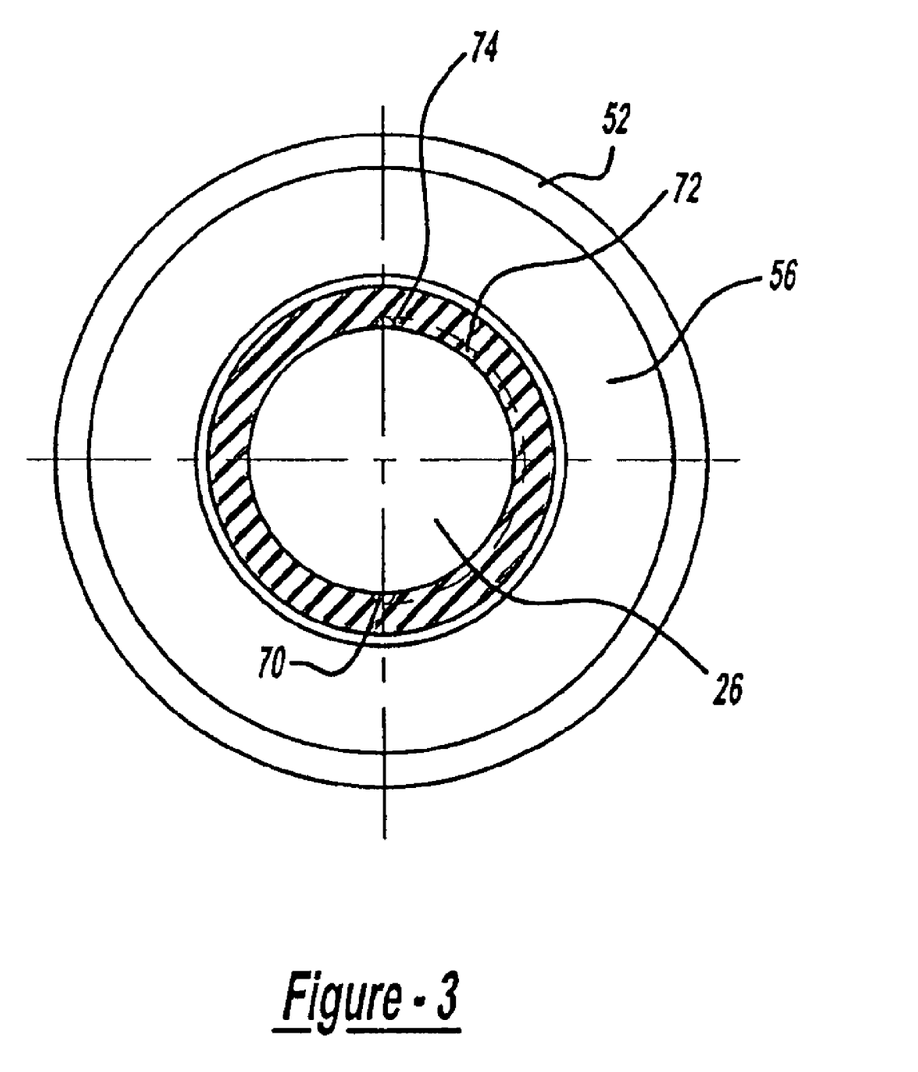
FIG. 3 shows a cross section of the constant velocity joint according to the present invention taken along line 3—3 of FIG. 2.

FIGS. 2 and 3 show one embodiment of the present invention. The constant velocity joint 10 is a fixed constant velocity joint of the mono block style and is generally used in the prop shaft 26 in an all wheel drive vehicle. It should be noted that any other type or variety of constant velocity joint may also be used for the present invention. The constant velocity joint 10 as shown in FIG. 2 includes an outer race 36, which has a shaft 38 extending from one end thereof. An inner wall 40 of the outer race 36 generally defines a constant velocity joint chamber 42. An inner race 44 is arranged or located within the outer race 36. The inner race 44 is connected to the drive shaft or prop shaft 26 of the vehicle. A plurality of balls or rolling elements 46 are located between an outer surface of the inner race 44 and an inner surface of the outer race 36. The ball 46 is held in position between the outer race 36 and inner race 44 surfaces by a cage 48. Each race ball 46 is located within an indentation of the outer race inner surface 40. The rotation of the outer race 36 will rotate the inner race 44 at the same or constant speed thus allowing for constant velocity to flow through the joint between two shafts or between the prop shaft 26 and the power take off unit 18, that is angled up to a predetermined fixed angle. The constant velocity joint 10 will allow the angle to change because the balls 46 will be able to rotate and compensate for any difference in the angle between the shafts by moving within the outer race 36 and inner race 44 indentations.

A ring retainer 50 is located on an inside surface of the inner race 44 to allow for a connection of the prop shaft 26 to the inner race 44. A boot cover 52 is connected to the outer surface of the outer race 36. One end of the boot cover 52 has a channel 54 that extends along the entire periphery of the boot cover 52. One end of a boot member 56, which in one embodiment, is made of a urethane or other rubber material, contacts the boot cover 52. However, it should be noted that any other type of hard plastic or soft rubber or any other know pliable material may also be used for the boot 56. The boot 56 is secured within the channel 54 of the boot cover 52 while the opposite end of the boot 56 engages the prop shaft 26 and is held in place by a boot clamp 58. The boot 56 also includes an integrated vent 60 on the end secured to the prop shaft 26. The boot 56 will seal the constant velocity joint 10 from any outside contaminants such as water, dirt and road grime. The simpleness of the urethane boot 56 allows for a seal interface through any angle of inclination that a drive shaft or half shaft may encounter during normal driving operations.

An interior surface 40 of the outer race 36 includes a first shoulder portion 62 and a second shoulder portion 64. The first shoulder portion 62 includes a first plug or cover 66 which is generally made of a metal material and seals the outer race inner chamber 42 from transmission oils or contaminants of the transmission. In contact with the second shoulder 64 of the outer race 36 is a second plug or cover 68 which in one embodiment is made of metal but maybe made of any other type of ceramic, hard plastic or other metal composite material depending on the needs and design requirements of the constant velocity joint 10. It should be noted that the second plug 68 is optional and is not necessary in all applications.

The vent 60 for the present constant velocity joint 10, as described in one embodiment, is integrated with one end of the boot member 56. The integrated vent 60 in one embodiment has a generally labyrinth style vent 60 however it should be noted that any other style of vent may also be used depending on the design characteristics needed and the operational speeds of the constant velocity joint 10. The vent 60 includes a plurality of integrally molded channels within the inner surface of the boot 56. It should be noted that one embodiment uses a molding process to put the channels on the inner surface of the boot 56 but any other type of a method known such as cutting or other post molding procedures maybe used to put the channels into the inside surface of the boot 56. The vent 60 is located on the end of the boot 56 that engages the drive shaft 26 and is held in place by a boot clamp 58.

The vent 60 includes a first axial channel 70 molded into an inside surface of the boot 56. The first axial channel 70 is in communication with and connects to the internal chamber 42 of the constant velocity joint 10 along the surface of shaft. The first axial channel 70 has predetermined length on the inside surface of the boot 56. A circumferential channel 72 engages and connects to an end of the first axial channel 70 opposite of the end that connects or communicates with the chamber 42 of the constant velocity joint 10. The circumferential channel 72 is molded on an inside circumference of the boot 56 at a predetermined location. In one embodiment the circumferential channel 72 will extend through a one hundred and eighty degree arc on the inside surface of the boot 56. However, it should be noted that any other dimension maybe used for the arc i.e., from 20° to 340°. Thus, the first axial channel 70 is in gaseous or liquid communication with the internal chamber 42 of the constant velocity joint 10 and with one end of the circumferential channel 72. It should be noted that it is contemplated to have a plurality of channels form said first axial channel 70 wherein one end of each of said plurality of channels is in communication with the internal chamber while the opposite ends are in communication with the circumferential channel 72.

Extending from the opposite end of the circumferential channel 72 is a second axial channel 74. The second axial channel 74 is also molded into an inside surface of the boot 56. The second axial channel 74 is connected to and is in communication with the circumferential channel 72 such that a venting gas is properly channeled from the chamber 42 of the constant velocity joint 10 into the first axial channel 70 then into the circumferential channel 72 and then through the second axial channel 74. The second axial channel 74 is located on the opposite side of the inside surface i.e., 180° away, of the boot 56 from the first axial channel 70. The axial channel 70, 74 are both located at one of the end of the circumferential channel 72 which forms the 180° arc. Therefore, the first and second axial channels 70, 74 are planar with respect to a cross section taken along the axis 76 of the constant velocity joint drive shaft 26.

A diaphragm 78 is connected to the second axial channel 74 on the end opposite from that connected to the circumferential channel 72. The diaphragm 78 includes a circular notch 80 along the entire inner circumference of the boot 56. Thus, the diaphragm 78 is connected to and in communication with the second axial channel 74. The diaphragm 78 also includes a flapper valve 82 extending from an end thereof and in contact with the drive shaft 26 of the constant velocity joint 10. The outer surface of the boot 56 also includes a notch 84 which is used to locate and secure the boot clamp 58 along the end of the constant velocity joint boot 56. In one embodiment the boot 56 is made of any pliable material such that the flapper valve 82 is capable of letting gas escape but is also capable of a proper seal against the drive shaft 26 to prevent the ingress of contaminants and water into the inner chamber 42 of the constant velocity joint 10. It should be noted that the first axial channel 70, the circumferential channel 72, second axial channel 74 and the diaphragm 78 form a pressure equalization mechanism which allows the constant velocity joint 10 to vent pressure to the outer atmosphere. Prior art constant velocity joints have a tendency to allow contaminants into the inner chamber of the constant velocity joint when the constant velocity joint is submerged or soaked in water or other contaminants, thus creating a back pressure. However, in the present invention this backpressure would force the flapper valve 82, on the outer edge of the boot 56, to compress against the drive shaft 26 thus sealing the vent 60 from any contaminants in the outer atmosphere.

Figure 4:
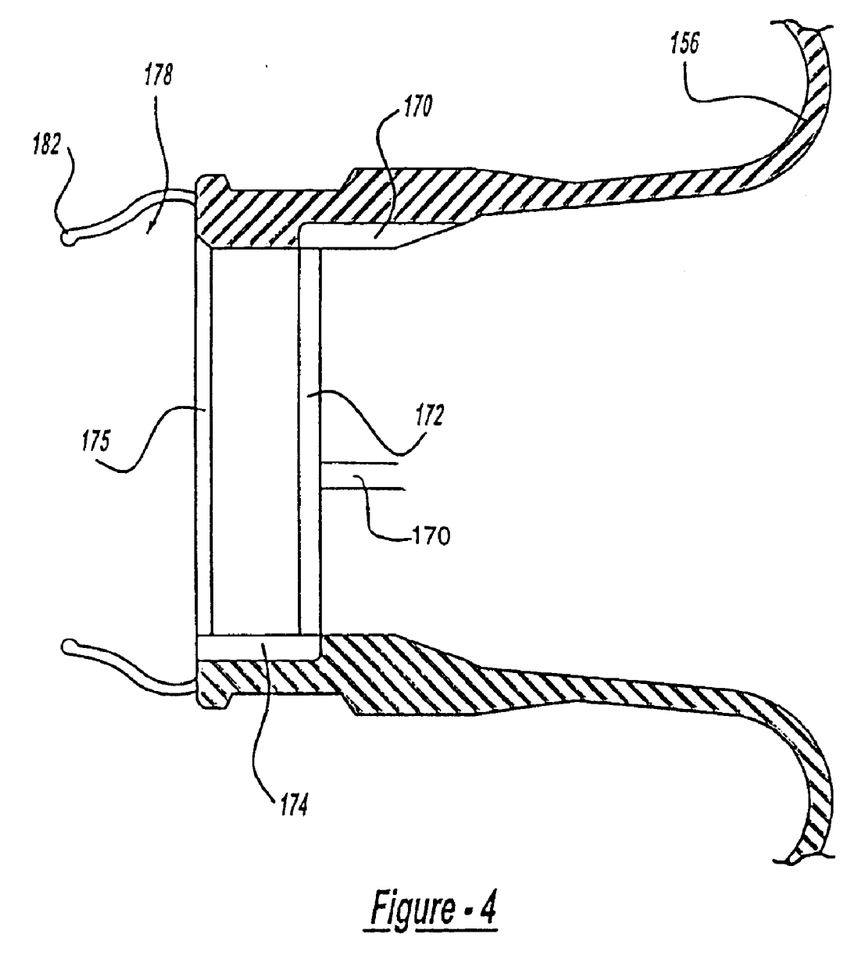
FIG. 4 shows an alternate embodiment and cross section of the constant velocity joint according to the present invention.

FIG. 4 shows an alternate embodiment of the present invention, it should be noted that like elements are represented by like numerals. A partial cross section of the boot member 156 is shown. The boot 156 includes a first axial channel 170 and a second axial channel 174 connected to one another by a circumferential channel 172 on the inside surface of the outer end of the boot 156. A second circumferential channel 175 is located on the end of the second axial channel 174 around the entire inner periphery of the inside surface of the boot member 156. The second circumferential channel 175 will have an angle and the angle will help propel, any gas being expelled, into the diaphragm 178 and then through the flapper 182. The flapper valve 182 maybe made of any pliable material and may also be a different material than the boot 156, and is connected by any known molding process to the end of the boot member 156. The flapper valve 182 has a greater pliability then that of the other embodiment thus enabling a more varied control factor over the venting of the gas and sealing of the outer atmosphere to the internal vent mechanism. It should be noted that any type of pliable material maybe used for the flapper 182 but also that any other type of material such as a soft composite or metal material may also be used.

In operation the constant velocity joint 10 is filled with lubricant to reduce the internal temperature and lubricate the moving parts within the constant velocity joint 10. In one embodiment, the lubricant is a grease, which is placed within the inner chamber 42 of the constant velocity joint 10. The constant velocity joint 10 is then sealed there after via the boot cover 52 and boot 56. When the constant velocity joint 10 is spinning at high speed, the boot 56 may rupture prematurely if there is no venting of the internal pressure of the constant velocity joint 10 which results in failures of the boot and constant velocity joint. Current prior art constant velocity joints tend to use a venting hole in a center of an end cap or through the side of the outer race for equalizing joint pressure, but this solution in very specific and seldomly encountered conditions may not completely obstruct water and contaminants from entering the joint and may also become easily plugged by the lubricant within the joint. Therefore, at high pressures, high speeds and high temperatures, the constant velocity joint vent mechanism must be able to equalize internal and external pressure differences while also stopping the ingress of contaminants into the constant velocity joint. Furthermore, the vent must also be resistant to grease and heat while also being pliable enough to allow for the release of the internal pressures.

In one embodiment the vent 60 for the current invention is a labyrinth style vent 60 integrated within the end of the boot 56. The integrated vent 60 has a flapper 82 on the end of the boot 56 which will repel any water or contaminants that try to enter the constant velocity joint 10 from the external environment by compressing the flapper 82 into the drive shaft 26, thus preventing any external contaminants from entering the diaphragm area of the constant velocity joint vent 60. The integrated vent 60 in the end of the boot 56 may also be designed for any functional pressure range depending on the internal pressures that are needed to deform the boot 56 during operation of the high speed constant velocity joint 10. Hence, the integrated vent 60 is capable of being designed to fit the specific type of environment that the constant velocity joint 10 will be used in. With the vent 60 preventing any water or grime from entering the constant velocity joint chamber 42, the vent 60 will help reduce any contamination of the grease. It has been shown that grease will break down when mixed with water or dirt, thus reducing its lubricating properties and increasing the internal temperatures and pressures of the constant velocity joint 10. When these pressures reach a critical point the boot 56 will rip, tear or rupture thus leading to premature failure of the constant velocity joint 10.

The specifically designed diaphragm 78 will further protect any contaminants from the outer atmosphere entering the joint. By capturing and holding the contaminants and not allowing them passage into the second axial channel 74. The diaphragm 78 will also assist in equalizing the difference in pressures i.e., when the internal pressure of the constant velocity joint 10 is greater than the external atmospheric pressure surrounding the constant velocity joint 10, by lifting or removing the diaphragms seal with the drive shaft 26 and thereby connecting the internal atmosphere of the constant velocity joint 10 via the continuous channel formed by the first axial channel 70, the circumferential channel 72 and the second axial channel 74, to the external outer atmosphere. It should be noted that a reverse phenomena occurs when the external atmospheric pressure is greater than the internal pressure of the constant velocity joint 10. In this case the diaphragm seal will be compressed and locked down against the drive shaft 26 thus providing an impervious joint to any contaminants entering from the outside atmosphere. When the constant velocity joint 10 attains a critical speed the diaphragm seal will then begin to remove or lift away from the drive shaft 26 due to the centrifugal forces being generated, this then will expose and allow the continuous channel to once again begin equalization of the pressure difference between the internal chamber of the constant velocity joint 10 and the outer atmospheric pressure. The use of this labyrinth style vent 60 will ensure that the boot 56 does not become inverted during operation by controlling the pressure released by any internal pressure or backpressure.

It should be noted that most prior art constant velocity joints use a variety of methods of venting the high pressure gas out of the joints, however if any contaminants entered the inner chamber of the constant velocity joint such as water or grime this would increase the heat and pressure which would eventually increase boot failure by either a rupture of the boot or a crack in the boot thus leading to a complete failure of the constant velocity joint. Therefore, the venting solution according to the present invention over comes these problems with other prior art devices by using a vent 60 that is pliable and will not allow water and contaminants into the chamber 42 of the constant velocity joint 10 but will allow the venting of high pressure and high temperature gas to the atmosphere thus increasing the life of the constant velocity joint 10 and its boot member 56. The specific design of the constant velocity joint 10 according to the present invention can be used with any high speed, high temperature application but can also be used on low speed applications depending on the design of the vent mechanism.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention maybe practiced otherwise then as specifically described.

What is claimed is:

1. A vent for a constant velocity joint, said vent including:
   a body generally having a cylindrical shape;
   a first axial channel on an inside surface of said body, said first axial channel is in communication with an internal chamber of the constant velocity joint;
   a semi circumferential channel in communication with said first axial channel on one end thereof;
   a second axial channel in communication with said semi circumferential channel on another end thereof; and
   a diaphragm arranged at one end of said body, said diaphragm in communication with said second axial channel.

2. The vent of claim 1 wherein said body having an appendage extending from one end thereof.

3. The vent of claim 2 wherein said appendage defines in part said diaphragm.

4. The vent of claim 1 wherein said semi circumferential channel covers an arc of approximately 180°.

5. The vent of claim 3 wherein said second axial channel is on an inside surface of said body.

6. The vent of claim 1 wherein said vent is made of a pliable material.

7. The vent of claim 1 wherein said first axial channel, said semi-circumferential channel, and said second axial channel form a pressure equalization mechanism for said vent.

8. The vent of claim 6 wherein said pliable material is rubber.

9. The vent of claim 4 wherein said circumferential channel repels liquid from entering the vent while allowing pressure to exit from the vent.

10. The vent of claim 1 further including a circumferential groove on an outside surface of said body.

11. A constant velocity joint for use in a vehicle drive train, said constant velocity joint including:
    an outer race, said outer race defining in part a chamber in said constant velocity joint;
    an inner race, said inner race arranged within said outer race;
    a rolling element disposed between said inner race and said outer race;
    a cage in contact with said rolling element;
    a boot cover secured to one end of said outer race;
    a shaft engaging said inner race; and
    a boot having an integrated vent therein, said vent having a first axial channel in communication with said chamber, said vent having a circumferential channel connected to said first axial channel, said vent having a second axial channel connected to said circumferential channel, said vent having a diaphragm connected to said second axial channel, said boot in contact with said boot cover on one end thereof and in contact with said shaft on said vent portion end of said boot.

12. The constant velocity joint of claim 11 wherein said first and second axial channel having a common plane with an axis of said shaft.

13. The constant velocity joint of claim 11 wherein said having a circular notch therein.

14. The constant velocity joint of claim 11 wherein said first axial channel having a plurality of channels therein.

15. The constant velocity joint of claim 13 wherein said diaphragm equalizes the pressure between said chamber and the atmosphere.

16. The constant velocity joint of claim 15 wherein said diaphragm will compress against said shaft when an external pressure is greater than an internal pressure providing a barrier to contaminates from entering the constant velocity joint.

17. The constant velocity joint of claim 16 wherein said diaphragm will separate from said shaft when the constant velocity joint reaches a predetermined speed and open said second axial channel to allow for said pressure equalization.

18. A constant velocity joint for use in a vehicle, said constant velocity joint having an internal chamber that may be under pressure with relation to the atmosphere, said constant velocity joint including:
    an outer race;
    an inner race arranged within said outer race;
    a rolling element disposed between said inner race and said outer race;
    a shaft engaging said inner race; and a boot arranged between said outer race and said shaft, said boot having an integrated vent on one end thereof, said vent includes a first molded axial channel on an inside surface of said boot in communication with the internal chamber, a circumferential molded channel connected to said first molded axial channel extending along an approximately 180° arc of said inside surface of said boot, a second molded axial channel on an inside surface of said boot connected to said circumferential molded channel a diaphragm connected to said second molded axial channel and arranged on an end of said boot having a generally circular notch extending around the entire inner circumference of said boot, said first axial channel, said circumferential channel, said second axial channel and said diaphragm form a continuous channel for use in equalizing any pressure differences between the internal chamber and the atmosphere, said boot is made of a pliable material.

* * * * *

UNITED STATES PATENT AND TRADEMARK OFFICE
CERTIFICATE OF CORRECTION

PATENT NO. : 6,793,584 B2
DATED : September 21, 2004
INVENTOR(S) : John A. Ramey and Michael James Miller It is certified that error appears in the above-identified patent and that said Letters Patent is hereby corrected as shown below:

<u>Column 8,</u>
Line 43, after "claim", delete "11" and insert -- 12 --.
Line 43, after "said", insert -- diaphragm --.

Signed and Sealed this

Fifteenth Day of February, 2005

JON W. DUDAS
*Director of the United States Patent and Trademark Office*